United States Patent
Naughton-Green et al.

(10) Patent No.: US 10,826,913 B2
(45) Date of Patent: Nov. 3, 2020

(54) APPARATUS AND METHOD FOR PROVIDING SECURITY SERVICE IN COMMUNICATION SYSTEM

(71) Applicant: Samsung Electronics Co., Ltd., Suwon-si, Gyeonggi-do (KR)

(72) Inventors: Jonathan David Naughton-Green, Staines (GB); Arthur Simon Waller, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/686,966

(22) Filed: Aug. 25, 2017

(65) Prior Publication Data
US 2018/0063159 A1   Mar. 1, 2018

(30) Foreign Application Priority Data
Aug. 25, 2016  (GB) .................................... 1614526

(51) Int. Cl.
| | | |
|---|---|---|
| *H04L 29/06* | (2006.01) | |
| *H04L 29/08* | (2006.01) | |
| *H04L 9/08* | (2006.01) | |
| *H04L 9/32* | (2006.01) | |
| *H04L 12/18* | (2006.01) | |

(52) U.S. Cl.
CPC .............. *H04L 63/123* (2013.01); *H04L 9/08* (2013.01); *H04L 9/3271* (2013.01); *H04L 63/145* (2013.01); *H04L 63/1466* (2013.01); *H04L 67/34* (2013.01); *H04L 12/18* (2013.01); *H04L 2209/601* (2013.01)

(58) Field of Classification Search
CPC ...................................................... H04L 63/123
USPC .......................................................... 726/22
See application file for complete search history.

(56) References Cited

U.S. PATENT DOCUMENTS

| | | | | |
|---|---|---|---|---|
| 5,978,476 A | * | 11/1999 | Redman ................. | G06F 21/10 345/468 |
| 9,313,540 B2 | | 4/2016 | Kooman | |
| 2003/0182414 A1 | * | 9/2003 | O'Neill ................ | G06F 9/3004 709/223 |

(Continued)

FOREIGN PATENT DOCUMENTS

| | | |
|---|---|---|
| EP | 1 045 585 A1 | 10/2000 |
| GB | 2535146 A | 8/2016 |

(Continued)

OTHER PUBLICATIONS http://www.ibtimes.co.uk/its-official-your-smart-tv-can-be-hijacked-malware-holding-viewers-ransom-1537533-January 1.

(Continued)

*Primary Examiner* — Harris C Wang
(74) *Attorney, Agent, or Firm* — Jefferson IP Law, LLP

(57) ABSTRACT

An apparatus and a method for providing a security service in a communication system are provided. The security device includes a receiver configured to receive validation information used for validating data received by a receiving apparatus from the receiving apparatus, at least one processor configured to determine whether the validation information matches set validation related information, and a transmitter configured to transmit information indicating the determined result to the receiving apparatus.

10 Claims, 6 Drawing Sheets

(56) References Cited

U.S. PATENT DOCUMENTS

| | | | | |
|---|---|---|---|---|
| 2004/0225894 | A1* | 11/2004 | Colvin | G06F 21/121 |
| | | | | 726/27 |
| 2004/0249759 | A1* | 12/2004 | Higashi | H04N 21/44204 |
| | | | | 705/59 |
| 2005/0138401 | A1* | 6/2005 | Terao | H04N 21/43853 |
| | | | | 713/189 |
| 2005/0144634 | A1* | 6/2005 | Koo | H04N 21/47211 |
| | | | | 725/31 |
| 2005/0157878 | A1* | 7/2005 | Matsushita | H04N 21/2585 |
| | | | | 380/239 |
| 2007/0113073 | A1* | 5/2007 | Maillard | H04N 5/913 |
| | | | | 713/156 |
| 2009/0199276 | A1* | 8/2009 | Schneider | H04L 63/0815 |
| | | | | 726/5 |
| 2010/0323763 | A1* | 12/2010 | Englebrecht | H04H 20/57 |
| | | | | 455/566 |
| 2012/0047277 | A1* | 2/2012 | Keidar | H04N 5/50 |
| | | | | 709/230 |
| 2012/0222092 | A1* | 8/2012 | Rabii | H04N 21/41407 |
| | | | | 726/4 |
| 2013/0061267 | A1* | 3/2013 | Cansino | H04N 21/4788 |
| | | | | 725/43 |
| 2013/0103847 | A1 | 4/2013 | Brown et al. | |
| 2013/0298169 | A1* | 11/2013 | Wells | H04H 20/91 |
| | | | | 725/61 |
| 2014/0006474 | A1* | 1/2014 | White | H04N 21/4782 |
| | | | | 709/201 |
| 2014/0122644 | A1 | 5/2014 | Kuscher et al. | |
| 2014/0143137 | A1 | 5/2014 | Carlson | |
| 2014/0195584 | A1* | 7/2014 | Harrison | G06F 15/16 |
| | | | | 709/201 |
| 2014/0215018 | A1 | 7/2014 | Lam | |
| 2014/0359296 | A1* | 12/2014 | Alrabady | H04L 9/3247 |
| | | | | 713/176 |
| 2015/0058878 | A1* | 2/2015 | Hill-Jowett | H04N 21/4825 |
| | | | | 725/31 |
| 2015/0149778 | A1* | 5/2015 | Nakano | G06F 21/10 |
| | | | | 713/169 |
| 2015/0286369 | A1* | 10/2015 | Pontual | H04N 21/6581 |
| | | | | 715/719 |
| 2015/0358169 | A1 | 12/2015 | Krishnamurthy et al. | |
| 2016/0007071 | A1* | 1/2016 | Burckard | H04N 21/42684 |
| | | | | 725/31 |
| 2016/0050190 | A1* | 2/2016 | Mooij | H04N 21/6334 |
| | | | | 380/279 |
| 2016/0150583 | A1 | 5/2016 | Panther | |
| 2016/0234690 | A1* | 8/2016 | Michalski | H04W 12/0802 |
| 2016/0259930 | A1* | 9/2016 | Jerusalimsky | G06F 21/316 |
| 2017/0070513 | A1* | 3/2017 | Robertson | G06F 16/903 |
| 2017/0078275 | A1* | 3/2017 | Slovetskiy | H04L 63/0838 |
| 2017/0221055 | A1* | 8/2017 | Carlsson | G06Q 20/3278 |
| 2018/0063159 | A1* | 3/2018 | Naughton-Green | H04L 9/08 |

FOREIGN PATENT DOCUMENTS

| | | |
|---|---|---|
| KR | 10-2010-0113238 A | 10/2010 |
| WO | 2016-110718 A1 | 7/2016 |

OTHER PUBLICATIONS

Extended European Search Report dated Jun. 18, 2019, issued in European Application No. 17843999.8.

\* cited by examiner

APPARATUS AND METHOD FOR PROVIDING SECURITY SERVICE IN COMMUNICATION SYSTEM

CROSS-REFERENCE TO RELATED APPLICATION(S)

This application claims the benefit under 35 U.S.C. § 119(a) of a Great Britain patent application filed on Aug. 25, 2016 in the United Kingdom Intellectual Property Office and assigned Serial number 1614526.0, the entire disclosure of which is hereby incorporated by reference.

TECHNICAL FIELD

The present disclosure relates to an apparatus and a method for providing a security service in a communication system. More particularly, the present disclosure relates to an apparatus and a method for validating data in a communication system.

BACKGROUND

External security modules have been developed which can be installed in broadcast receiving apparatus, such as a television (TV), to provide additional security services. One example of the external security modules is a common interface plus conditional access module (CI+CAM). For example, the CI+CAM can be used by the TV to decrypt broadcast content. The TV transmits the entire multiplex to the CI+CAM, and then the CI+CAM may decrypt the relevant content and access any files within the multiplex. However, this arrangement carries significant overhead. A more efficient solution for managing communications between a broadcast receiving apparatus and an external security module would therefore be desirable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for providing a security service in a communication system.

Another aspect of the present disclosure is to provide an apparatus and a method for validating data in a communication system.

Another aspect of the present disclosure is to provide an apparatus and a method for managing a communication between a broadcast receiving apparatus and a security device in a communication system.

Another aspect of the present disclosure is to provide an apparatus and a method for increasing reliability for data in a communication system.

Another aspect of the present disclosure is to provide an apparatus and a method for preventing broadcast signal intrusion.

In accordance with an aspect of the present disclosure, a security device in a communication system is provided. The security device includes a receiver configured to receive validation information used for validating data received by a receiving apparatus from the receiving apparatus, at least one processor configured to determine whether the validation information matches set validation related information, and a transmitter configured to transmit information indicating the determined result to the receiving apparatus.

In accordance with another aspect of the present disclosure, a receiving apparatus in a communication system is provided. The receiving apparatus includes a receiver configured to receive data from a transmitting apparatus, a transmitter configured to transmit validation information used for validating data received by the receiving apparatus to a security device based on the data, and at least one processor, wherein the receiver is further configured to receive information indicating whether the validation information matches validation related information set in the security device from the security device, and perform an action for the received data if the information indicates that the validation information matches the validation related information set in the security device.

In accordance with another aspect of the present disclosure, a security device in a communication system is provided. The security device includes a receiver configured to receive a first message including security information used for validating an external device which wants to communicate with a receiving apparatus from the receiving apparatus, at least one processor configured to determine whether the security information matches set validation related information, and a transmitter configured to transmit a second message including information indicating the determined result to the receiving apparatus.

In accordance with another aspect of the present disclosure, a receiving apparatus in a communication system is provided. The receiving apparatus includes a receiver configured to receive a first message indicating that an external device wants to communicate with the receiving apparatus from the external device, and a transmitter configured to transmit a second message including information used for validating the external device to a security device, wherein the receiver is further configured to receive a third message including information indicating whether the security information matches validation related information set in the security device from the security device, and wherein, if the information indicates that the security information matches the validation related information set in the security device, the transmitter and the receiver communicate with the external device.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
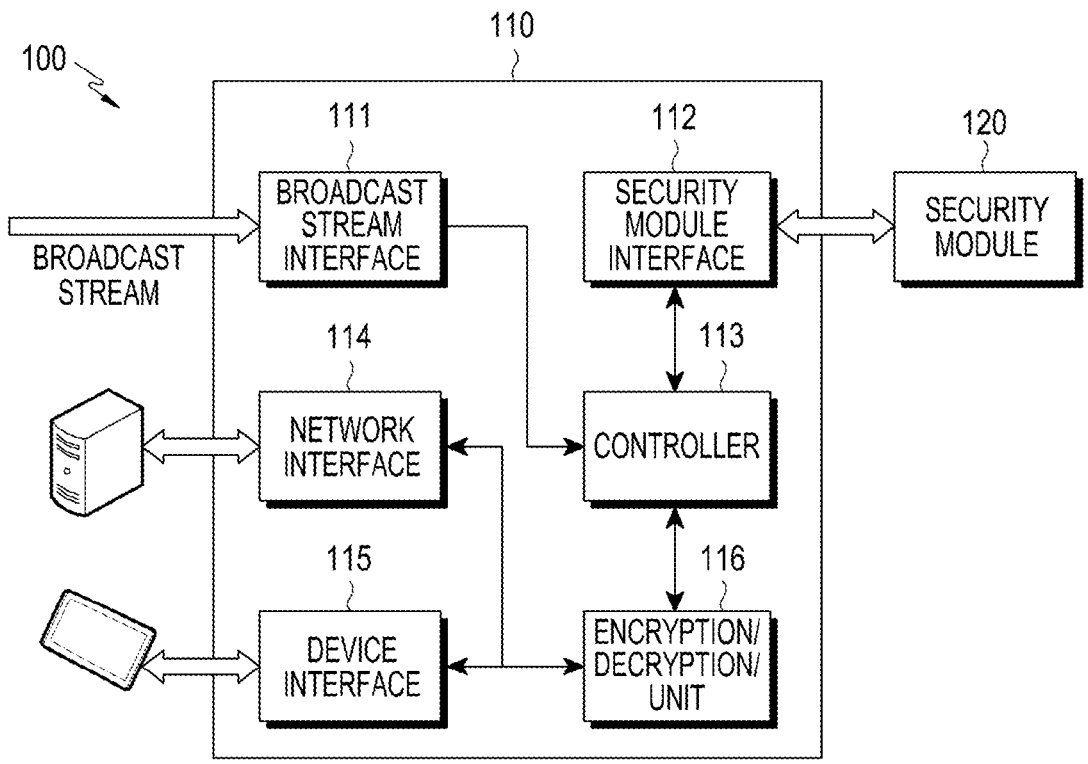
FIG. 1 schematically illustrates a broadcast system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers, such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a motion picture experts group (MPEG-1 or MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a receiving apparatus may be, for example, a broadcast receiving apparatus. In various embodiments of the present disclosure, the term broadcast receiving apparatus may be interchangeable with the term broadcast receiver. In various embodiments of the present disclosure, a broadcast receiving apparatus may be a digital video broadcasting (DVB) receiver.

According to various embodiments of the present disclosure, a content provider may be, for example, a broadcaster.

According to various embodiments of the present disclosure, a companion screen (CS) device may be, for example, a user terminal. In various embodiments of the present disclosure, the term user terminal may be interchangeable with the terms user equipment (UE), terminal, device, wireless device, mobile device, mobile station (MS), and/or the like.

An embodiment of the present disclosure proposes an apparatus and a method for providing a security service in a communication system.

An embodiment of the present disclosure proposes an apparatus and a method for validating data in a communication system.

An embodiment of the present disclosure proposes an apparatus and a method for managing a communication between a broadcast receiving apparatus and a security device in a communication system.

An embodiment of the present disclosure proposes an apparatus and a method for increasing reliability for data in a communication system.

An embodiment of the present disclosure proposes an apparatus and a method for preventing broadcast signal intrusion.

An apparatus and a method proposed in an embodiment of the present disclosure may be applied to various communication systems, such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system, such as a mobile broadcast service, such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

Hereinafter, in various embodiments of the present disclosure, it will be assumed that a communication system is a broadcast system, however, various embodiments of the present disclosure are not limited to the broadcast system.

According to various embodiments of the present disclosure, a broadcast transmitting apparatus may be, for example, one of a broadcaster, a base station (BS), and/or the like, and the term broadcast transmitting apparatus may be interchangeable with the terms transmitting apparatus, data transmitting apparatus, and/or the like. Here, the term BS may be interchangeable with the terms evolved node B (eNB), access point (AP), and/or the like.

According to various embodiments of the present disclosure, a broadcast receiving apparatus may be, for example, one of a smart TV, a mobile terminal, and/or the like, and the term broadcast receiving apparatus may be interchangeable with the terms receiving apparatus, data receiving apparatus, and/or the like. Here, the term mobile terminal may be interchangeable with the terms user equipment (UE), mobile station (MS), mobile device, and/or the like.

In a general broadcast system, a broadcast receiving apparatus does not validate data, e.g., a content received by the broadcast receiving apparatus. For example, in the broadcast system, a broadcast transmitting apparatus validates a content, and various checks for confirming whether the content is valid are performed in the broadcast transmitting apparatus before transmission/deployment over a network is ready.

For accepting and installing an application or configuration information, the broadcast receiving apparatus needs to determine whether the content is received from a trusted source and is not tampered with. Accordingly, if any sort of protection system is not used, the broadcast receiving apparatus may only assume that the content received from the broadcast transmitting apparatus is not intruded by a hacker, and/or the like.

However, this assumption is not true, and generally, a broadcast receiving apparatus, e.g., a smart TV may be targeted by a hacker and the hacker may inject data to the content transmitted by the broadcast transmitting apparatus or corrupt the content.

Finally, an end-user, i.e., a viewer may be shown a content which is not generated by a broadcaster. An application which is compromised could trigger unwanted actions, for example, switching on a camera, or lead a user to a fraudulent site to extract credit card details, and/or the like. Accordingly, data validation in a broadcast system is one of important issues. Here, a broadcast receiving apparatus may determine data received for the broadcast receiving apparatus is not tampered with and what a broadcaster intends to be received.

Accordingly, various embodiments of the present disclosure propose an apparatus and a method for addressing a reliability issue, such as man in the middle attack, for example, for enhancing reliability for data transmitted/received between a broadcast transmitting apparatus and a broadcast receiving apparatus in a communication system.

In a general broadcast system, there is no scheme of preventing installation of a malware. Accordingly, a final end-user, e.g., a customer does not have freedom to safely install a new application as the new application is pushed to the customer. For example, loading of the new application or metadata is managed by a broadcaster. Accordingly, the broadcaster needs to update information, e.g., applications from time to time, e.g., in response to a change in network configuration.

Accordingly, various embodiments of the present disclosure propose schemes of providing a security service in a broadcast system, and specially propose schemes of providing a security service based on a security module. The security module may validate data provided from a broadcast stream, and the data is valid, for example, downloads are safe, so a broadcast receiving apparatus may receive a reliable service, and a broadcast provider, e.g., a broadcaster may make sure that viewers acquire data which is not tampered.

Meanwhile, in various embodiments of the present disclosure, a security module may be a removable security module. However, it is not essential that the security module is the removable security module, and the security module may be an additional component in a TV receiver, i.e., a separate sub-board or chip comprising the security module that is soldered or directly connected to a board of the TV.

Various embodiments of the present disclosure provide schemes for managing communications between a broadcast receiving apparatus and a security device. Here, the security device may be, for example, a security module, and it will be assumed that the security module is removable to the broadcast receiving apparatus. The security module provides a security service to the broadcast receiving apparatus, such as decrypting encrypted a content. For example, the security module may store decryption keys for decrypting a broadcasting content provided by a broadcaster or a group of broadcasters, to ensure that only consumers with the appropriate security module are able to access the encrypted broadcasting content. Security elements included in the security module are typically provided by a specialist security company. The security modules are typically provided as optional add-ons that can be purchased or rented, and hence are connected removably to a broadcast receiving apparatus, such as a smart television (TV), a digital TV, or a set-top box (STB) so that an end-user can easily install and replace the security module as and when it is needed.

In various embodiments of the present disclosure, a broadcast receiving apparatus may be a DVB receiver, and a security module may be removably connected to the broadcast receiving apparatus via a suitable plug-in connector, such as universal serial bus (USB) interface or a personal computer memory card international association (PCMCIA). In various embodiments of the present disclosure, a broadcast receiving apparatus may be configured according to a different standard, for example, an advanced television systems committee (ATSC) broadcasting standard. In various embodiments of the present disclosure, different types of interfaces to a security module may be used, including wireless connections, such as WiFi or Bluetooth.

An example of a structure of a broadcast system according to an embodiment of the present disclosure will be described with reference to FIG. 1.

FIG. 1 schematically illustrates a structure of a broadcast system according to an embodiment of the present disclosure.

Referring to FIG. 1, a broadcast system 100 comprises a broadcast receiving apparatus 110 and a security module 120. Here, the security module 120 is removably connected to the broadcast receiving apparatus 110.

The broadcast receiving apparatus 110 comprises a number of interfaces for communicating with other entities in a broadcasting system. In an embodiment of the present disclosure, the broadcast receiving apparatus 110 comprises a broadcast stream interface 111 for receiving a broadcast stream, such as a DVB broadcast stream, and further comprises a security module interface 112 that is removably connected to the security module 120. The broadcast receiving apparatus 100 further comprises a control unit 113, a network interface 114 for communicating with a network, such as an internet and/or a local area network (LAN), and a device interface 115 for communicating with an external device. In various embodiments of the present disclosure, the broadcast receiving apparatus 110 may use a single interface for connecting to the Internet and to external devices, for example a WiFi interface. Any of the interfaces shown in FIG. 1 may be embodied as wired or wireless connections.

In an embodiment of the present disclosure, the broadcast receiving apparatus 110 further comprises an encryption/decryption unit 116 for performing an encryption operation and a decryption operation. For example, the broadcast receiving apparatus 110 may use the encryption/decryption unit 116 to communicate securely with another device, such as an Internet server, an external device included in a LAN, and the security module 120, using shared encryption keys, such as a symmetric encryption key or public/private key encryption. External devices with which the broadcast receiving apparatus 110 may communicate include tablet, laptop or desktop computers, mobile phone handsets, wearable electronic devices, connected appliances, and/or the like. In FIG. 1, it will be assumed that the external devices with which the broadcast receiving apparatus 110 communicates include tablet, laptop or desktop computers, mobile phone handsets, wearable electronic devices, connected appliances, and/or the like, however, it will be noted that the external devices with which the broadcast receiving apparatus 110 communicates are not limited to these.

In an embodiment of the present disclosure, the broadcast receiving apparatus 110 receives a data file through one or more of the broadcast stream interface 111, network interface 114 and device interface 115. In an embodiment of the present disclosure, the broadcast receiving apparatus 110 uses the security elements included in the security module 120 to validate and/or decrypt the data file, prior to a certain action being taken on the data file, such as installing an application included in the data file or playing back audio/video data included in the data file. To validate and/or decrypt the data file, a controller 113 transmits information for use in validating the received data file to the security module 120 over the security module interface 112, and receives a validation result from the security module 120 over the security module interface 112. If the determined result from the security module 120 indicates successful validate for the data file, the controller 113 performs an action for the data file. Here, the action for the data file denotes an action which is performed based on the data file, and the action for the data file may be implemented with various forms. For example, the action for the data file may be implemented with various forms of displaying the data file, processing the data file, and/or the like, and a detailed description thereof will be omitted herein.

If the determined result from the security module 120 does not indicate the successful validate for the data file, that is, if the determined result from the security module 120 indicates that the data file is not valid, the controller 113 may discard without performing an action for the data file.

In this way, the broadcast receiving apparatus 110 can utilise the security capabilities of the security module 120 in order to verify whether or not the data file received by the broadcast receiving apparatus 110 can be trusted. In some embodiments of the present disclosure, the security module 120 may also decrypt data included in the data file and transmit the decrypted data to the broadcast receiving apparatus 110. In this case, the broadcast receiving apparatus 110, not the security mode 120, may perform a validation operation on the received data file.

An inner structure of a security module in a broadcast system according to an embodiment of the present disclosure will be described with reference to FIG. 2.

Figure 2:
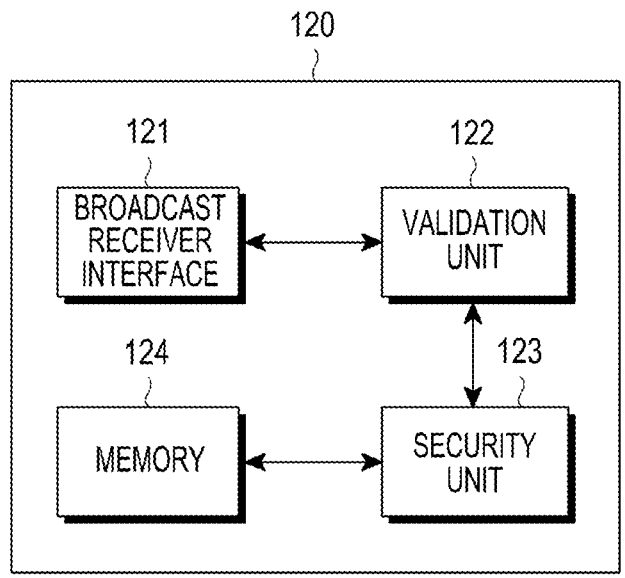
FIG. 2 schematically illustrates an inner structure of a security module in a broadcast system according an embodiment of the present disclosure.

FIG. 2 schematically illustrates an inner structure of a security module in a broadcast system according to an embodiment of the present disclosure.

Referring to FIG. 2, it will be noted that an inner structure of a security module in FIG. 2 is, for example, an inner structure of a security module 120 in FIG. 1.

As shown in FIG. 2, a security module 120 according to an embodiment of the present disclosure comprises a broadcast receiver interface 121 to be removably connected to a broadcast receiving apparatus 110, and a validation unit 122 to receive information for use in validating a data file via the broadcast receiver interface 121. For convenience, information for use in validating a data file will be referred to as data file validation information. The validation unit 122 attempts to validate the data file based on the received data file validation information, and informs the broadcast receiving apparatus 110 of a result of the validation via the broadcast receiver interface 121.

The security module 120 receives validation related information from a broadcaster, and the validation related information is used for validating the data file validation information received from the broadcast receiving apparatus 110. For example, if the validation related information received from the broadcaster matches the data file validation information received from the broadcast receiving apparatus 110, the security module 120 may determine that the data file received in the broadcast receiving apparatus 110 is valid. A validating operation of the security module 120 will be described with reference to FIG. 5, and a detailed description thereof will be omitted herein.

The security module 120 may store the validation related information provided from the broadcaster by default without receiving the validation related information from the broadcaster. In this case, the security module 120 may determine whether the data file validation information received from the broadcast receiving apparatus 110 matches the validation related information stored as the default, and determine whether the data file received by the broadcast receiving apparatus 110 is valid based on the determined result even though the security module 120 does not receive the validation related information from the broadcaster.

In an embodiment of the present disclosure, the broadcast receiving apparatus 110 discovers location of the data file and download the data file from the discovered location. In an embodiment of the present disclosure, the data file may be, for example, an application configured to be executed at the broadcast receiving apparatus 110, or may be another type of data file, such as a multimedia file. If the data file is received via a broadcast steam, the data file may be encapsulated based on, for example, a digital storage media command and control (DSM-CC) carousel. If the data file is received via a web source, such as an internet server, the data file could be retrieved using a suitable protocol, such as a hypertext transfer protocol (HTTP) or file transfer protocol (FTP). Furthermore, in some embodiments of the present disclosure, the data file could be received from an external device, for example a USB memory stick. Depending on the manner in which the data file is received by the broadcast receiving apparatus 110, the data file may be encapsulated in a preset scheme and/or may be encrypted.

In some embodiments of the present disclosure, a downloaded file may include a header, body and footer. For convenience, the header included in the file will be referred to as file header. The body may itself contain separate body header and body contents parts. The body contents may store the data of interest, which may be encrypted, signed and/or compressed. The file header may contain various parameters, such as a parameter indicating whether the body is encrypted, an encrypted algorithm used to encrypt the body, a list of authorised entities who are permitted to have access to the body, and/or the length of the body. The body header may contain a parameter indicating a size of the body contents and a compression scheme that has been applied to the body contents, and/or the like. The footer may contain information, such as a cryptographic signature or hash of the body.

In an embodiment of the present disclosure, the controller 113 generates a hash of part or all of the received data file, and transmits the generated hash to the security module 120 as the information for use in validating the received data file, i.e., data file validation information. In this case, the data file will not include a header or footer.

In an embodiment of the present disclosure, the broadcast receiving apparatus 110 can transmit the complete data file to the security module 120 as the data file validation information.

In some embodiments of the present disclosure, the controller 113 formats the information related to the data file according to a format specified by the security module 120. For example, the security module 120 may tell the broadcast receiving apparatus 110 the size of the header and footer before the broadcast receiving apparatus 110 transmits the data file validation information. Alternatively, in other embodiments of the present disclosure, the controller 113 may use a preset data format. For example, the size of the header and/or footer of the data file may be defined in advance according to an agreed industry standard. In an embodiment of the present disclosure, the broadcast receiving apparatus 110 may transmit, to the security module 120, a header, a body and a footer included in the data file in three stages, or may transmit, to the security module 120, the entire data file in one go.

In various embodiments of the present disclosure, the controller 113 can packetize the data file into a plurality of data packets, and transmit the plurality of data packets to the security module 120 over the security module interface 112. For example, the size of each data packet may be selected according to an amount of memory available to the security module 120, which can be signalled to the controller 113 by the security module 120. Packetizing the data file into a plurality of data packets in the controller 113 can make it easier for the security module 120 to process the received data. For example, if the security module 120 has a relatively small memory capacity compared to the size of the data file received in the broadcast receiving apparatus 110, packetizing the data file into the plurality of data packets in the controller 113 can make it easier for the security module 120 to process the received data.

In various embodiments of the present disclosure, the controller 113 can transmit a header of the data file to the security module 120. The security unit 123 included in the security module 120 can then generate decryption information for use in decrypting the body of the data file, for example, a decryption initialisation vector or decryption key, and transmit the generated decryption information to the broadcast receiving apparatus 110 via the broadcast receiver interface 121. The controller 113 of the broadcast receiving apparatus 110 decrypts the body of the data file based on the decryption information. This approach can reduce the communication overhead between the broadcast receiving apparatus 110 and the security module 120, since the broadcast receiving apparatus 110 can proceed to perform a decrypting operation on the body of the data file without needing to transmit the entire body to the security module 120.

Furthermore, in various embodiments of the present disclosure, the controller 113 can generate the information for use in validating the received data file, i.e., data file validation information, based on the decrypted body, and transmit the generated data file validation information to the security module 120 without transmitting the entire decrypted body. For example, the controller 113 may generate a hash function or cryptographic signature of the body of the data file, and transmit the hash function or cryptographic signature to the security module 120. The footer of the data file may also include a digital signature to verify that the digital image is correct and has not been tampered with, and the controller 113 may include the digital signature in the data file validation information, and transmit the data file validation information in which the digital signature is included to the security module 120.

In an embodiment of the present disclosure, for example, methods, such as that performed by the broadcast receiving apparatus 110 and the security module 120 in the first embodiment enables the security module 120 to provide an additional security service to the broadcast receiving apparatus 110, in comparison to solutions which require the TV to be provided with shared secrets, such as a certificate according to the related art, public keys and dynamic keys which are established in order to transmit and validate data at the TV. In contrast, methods, such as those described above in relation to the first embodiment of the present disclosure enable the security module 120 to perform a validation operation, by transmitting data file validation information from the broadcast receiving apparatus 110 to the security module 120. This approach provides a more secure system, since the necessary shared secrets for validating the received data can be retained within the security module 110 as well as the broadcast receiving apparatus 110.

Although the broadcast stream interface 111, the security module interface 112, the controller 113, the network interface 114, the device interface 115, and the encryption/decryption unit 116 are described as separate units in the broadcast receiving apparatus 110 in FIG. 1, it is to be understood that the broadcast receiving apparatus 110 may be implemented with a form into which at least two of the broadcast stream interface 111, the security module interface 112, the controller 113, the network interface 114, the device interface 115, and the encryption/decryption unit 116 may be incorporated.

The broadcast receiving apparatus 110 may be implemented with at least one processor.

Although the broadcast receiver interface 121, the validation unit 122, a security unit 123, and a memory 124 are described as separate units in the security module 120 in FIG. 2, it is to be understood that the security module 120 may be implemented with a form into which at least two of the broadcast receiver interface 121, the validation unit 122, the security unit 123, and the memory 124 may be incorporated.

The security module 120 may be implemented with at least one processor.

A process of validating an external device in a broadcast system according to an embodiment of the present disclosure will be described with reference to FIG. 3.

Figure 3:
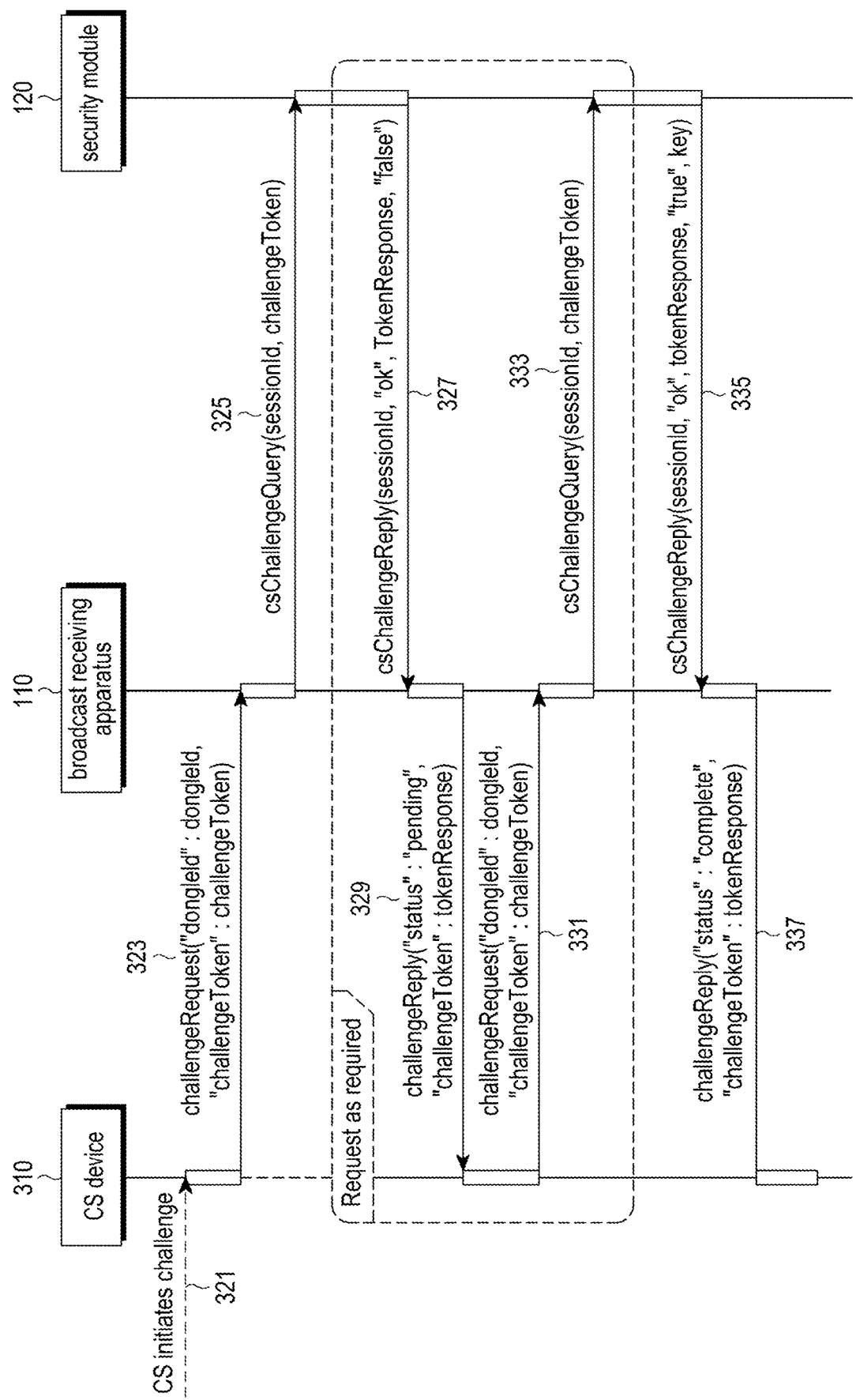
FIG. 3 schematically illustrates a process of validating an external device in a broadcast system according to an embodiment of the present disclosure.

FIG. 3 schematically illustrates a process of validating an external device in a broadcast system according to an embodiment of the present disclosure.

Referring to FIG. 3, it will be noted that a process of validating an external device in FIG. 3 is a process of validating an external device in a broadcast system as described in FIGS. 1 and 2.

The second embodiment of the present disclosure is similar to the first embodiment of the present disclosure in that a security module 120 is utilised to perform validation. However, in the first embodiment of the present disclosure, validation for a data file is performed, however, in the second embodiment the validation is performed in respect of an external device that wants to interact with the broadcast receiving apparatus 110, rather than on a data file. In various embodiments of the present disclosure, an external device is referred to as a 'CS device', meaning a device which is capable of displaying content related to broadcast content currently being reproduced by the broadcast receiving apparatus 110. In other embodiments of the present disclosure, the validation operation may be performed for a different type of external device, not the CS device.

Referring back to FIG. 3, the broadcast system includes a CS device 310, a broadcast receiving apparatus 110, and a security module 120. The CS device 310 begins by establishing a communication path to the broadcast receiving apparatus 110, for example, over a home network using a discovery protocol, such as discovery and launch (DIAL) and a communication path, such as a world wide web consortium (W3C) web socket. For example, the CS device 310 initiates a challenge process at operation 321. As shown in FIG. 3, the CS device 310 then transmits a message, for example, a challenge request (hereinafter, "challengeRequest") message indicating that the CS device 310 wants to interact with the broadcast receiving apparatus 110 in some way at operation 323. For example, the CS device 310 may request information from the broadcast receiving apparatus 110, such as a channel list or other electronic programme guide (EPG) information, or may request to take control of the broadcast receiving apparatus 110, for example, to change the current channel, or may request the broadcast receiving apparatus 110 to perform a task, such as playing specific content. The challengeRequest message can include an identifier of the security module 120 which identifies a particular type of security module 120 that will be capable of validating a particular CS device. Here, the identifier of the security module 120 may be, for example, a dongle identifier (dongleID). In an embodiment of the present disclosure, the challengeRequest message also includes a parameter "challengeToken" indicating a security token, e.g., a challenge token (hereinafter, "challengeToken") for use by the security module 120 to validate the CS device 310. Here, a value of the parameter "challengeToken" is set to a challengeToken of the CS device 310.

In an embodiment of the present disclosure, the controller 113 of the broadcast receiving apparatus 110 controls interactions between the broadcast receiving apparatus 110 and the external device. Upon receiving the challengeRequest message which requests a preset interaction from the CS device 310, the broadcast receiving apparatus 110 transmits a validation request message, e.g., a CS challenge query (hereinafter, "cschallengeQuery") message to the security module 120 at operation 325. The cschallengeQuery message transmitted at operation 325 includes security information, e.g., challengeToken, for use in validating a source of the cschallengeQuery message, i.e., the CS device 310. The cschallengeQuery message includes a session identifier (ID)

(hereinafter, "sessionID") of a session which is established between the broadcast receiving apparatus 110 and the security module 120. Upon receiving the csChallengeQuery message from the broadcast receiving apparatus 110, the security module 120 validates a source, i.e., the CS device 310, of the csChallengeQuery message based on the csChallengeQuery message, generates a CS challenge reply (hereinafter, "csChallengeReply") message based on a result of the validation, and transmits the csChallengeReply message to the broadcast receiving apparatus 110 at operation 327. The security module 120 validates the CS device 310 through a validation unit 122, and the csChallengeReply message includes information indicating the validation result, e.g., information indicating a validation result for the sessionID and information indicating a validation result for the challengeToken. At operation 327, it will be assumed that the validation result for the sessionID indicates that the sessionID is a correct sessionID, and the validation result for the challengeToken indicates that the challengeToken is not a correct challengeToken. In this case, in the csChallengeReply message, the determined result for the sessionID is set to "ok" for indicating that the sessionID is a valid sessionID, and a token response (hereinafter, "tokenResponse") parameter is set to "false" for indicating that the sessionID is an invalid sessionID.

Upon receiving the csChallengeReply message from the security module 120, the controller 113 of the broadcast receiving apparatus 110 may detect whether the validation for the CS device 310 is successful based on the csChallengeReply message. Since the validation result of the sessionID is set to "ok" and a parameter, i.e., the parameter "tokenResponse", indicating the validation result for the challengeToken is set to "false" in the csChallengeReply message received from the security module 120, the controller 113 may detect that the validation for the CS device 310 has failed.

Upon detecting that the validation for the CS device 310 has failed, the broadcast receiving apparatus 110 transmits a csChallengeReply message to the CS device 310 at operation 329. The csChallengeReply message includes "status" as a parameter indicating status of the challenge process and a parameter "challengeToken". The parameter "status" is set to "pending" indicating that the challenge process is progressing, and the parameter "challengeToken" is set to "tokenResponse."

Upon receiving the csChallengeReply message from the broadcast receiving apparatus 110, the CS device 310 may determine whether the CS device 310 may interact with the broadcast receiving apparatus 110 based on the csChallengeReply message. For example, the CS device 310 determines that the CS device 310 may not interact with the broadcast receiving apparatus 110 since the parameter "status" is set to "pending" indicating that the challenge process is progressing, and the parameter "challengeToken" is set to "tokenResponse". For example, the CS device 310 may determine that a negative result for the challengeRequest message transmitted at operation 323 is received.

The CS device 310 transmits a challengeRequest message to the broadcast receiving apparatus 110 at operation 331. Here, in the challengeRequest message transmitted at operation 331, a parameter "dongleID" is set to a dongleID of the CS device 310, and a parameter "challengeToken" is set to a challengeToken of the CS device 310.

Upon receiving the challengeRequest message from the CS device 310, the broadcast receiving apparatus 110 transmits a csChallengeQuery message to the security module 120. Here, the csChallengeQuery message transmitted at operation 333 includes security information, i.e., a challengeToken and a sessionID used for validating a source, i.e., the CS device 310 of the csChallengeQuery message.

Upon receiving the csChallengeQuery message from the broadcast receiving apparatus 110, the security module 120 validates a source, i.e., the CS device 310, of the csChallengeQuery message based on the csChallengeQuery message, generates a csChallengeReply message based on the validation result, and transmits the csChallengeReply message to the broadcast receiving apparatus 110 at operation 335. Here, the security module 120 validates the CS device 310 through the validation unit 122, and the csChallengeReply message includes information indicating the validation result, e.g., information indicating a validation result for a the sessionID and information indicating a validation result for the challengeToken. At operation 335, it will be assumed that the validation result for the sessionID indicates that the sessionID is a valid sessionID, and the validation result for the challengeToken indicates that the challengeToken is a valid challengeToken. In this case, in the csChallengeReply message transmitted at operation 335, a validation result for the sessionID is set to "ok" for indicating that the sessionID is a valid sessionID, and a parameter "tokenResponse" is set to "true" for indicating that the challengeToken is a valid challengeToken. Further, the csChallengeReply message transmitted at operation 335 includes an encryption key, the encryption key will be described below, and a detailed description thereof will be omitted herein.

Upon receiving the csChallengeReply message from the security module 120, the controller 113 may detect whether the validation for the CS device 310 is successful based on the csChallengeReply message. The controller 113 may detect that the validation for the CS device 310 is successful since the validation result for the sessionID is set to "ok" and a parameter, i.e., a parameter "tokenResponse", indicating the validation result for the challengeToken is set to "true" in the csChallengeReply message received from the security module 120. After detecting that the validation for the CS device 310 is successful, the broadcast receiving apparatus 110 permits interaction with the CS device 310.

After detecting that the validation for the CS device 310 is successful, the broadcast receiving apparatus 110 transmits a csChallengeReply message to the CS device 310 at operation 337. Here, the csChallengeReply message includes "status" as a parameter indicating status of the challenge process and a parameter "challengeToken". The parameter "status" is set to "complete" indicating that the challenge process has been completed, and the parameter "challengeToken" is set to tokenResponse.

As described above, in an embodiment of the present disclosure, the challenge process can involve one or more iterations between an operation of transmitting validation request, i.e., a challengeRequest message from the CS device 310 to the security module 120 and an operation of receiving the validation result by the security module 120 from the CS device 310. As shown in FIG. 3, the security module 120 may request additional security information from the CS device 310 by transmitting a csChallengeReply message with a parameter tokenResponse set to "false". This signals to the controller 113 that the CS device 120 has not yet been validated, and that additional security information is required.

The controller 113 requests the additional security information from an external device, i.e., the CS device 310, by transmitting a challengeReply message, and the CS device provides the additional security information through another challengeRequest message. The controller 113 transmits the additional security information of the CS device 310 to the security module 120 through another csChallengeQuery message.

These operations can be repeated for a preset number of iterations, and/or until the validation for the CS device 310 is successful in the security module 120.

The security unit 123 in the security module 120 may also generate an encryption key which can be used by the communication unit 116 to encrypt and decrypt future communications between the broadcast receiving apparatus 110 and the CS device, and the security module 120 can transmit the generated encryption key to the broadcast receiving apparatus 110. In an embodiment of the present disclosure, the generated encryption key may be included in a final csChallengeReply message.

Here, the final csChallengeReply message denotes a csChallengeReply message transmitted from the security module 120 to the broadcast receiving apparatus 110 after the validation for the CS device 310 is successful, and in FIG. 3, the csChallengeReply message transmitted at operation 335 may be the final csChallengeReply message. The key may be generated using a shared secret known only to the security module 120 and not the broadcast receiving apparatus 110. In this way, the broadcast receiving apparatus 110 can participate in secure communications with the CS device 310 without compromising the security of the shared secret stored in memory 124 of the security module 120.

In an embodiment of the present disclosure, by using the security module 120 to validate an external device, i.e., the CS device 310, the broadcast receiving apparatus 110 can have greater confidence that the CS device 310 can be trusted since the security module 120 has enhanced security capabilities in respect to the broadcast receiving apparatus 110 itself. During the challenge process shown in FIG. 3, the broadcast receiving apparatus 110 effectively acts as a proxy between the CS device and the security module 120, with the end result that the CS device 310 can be validated by the validation unit 122 in the security module 120.

A process of validating an external device in a broadcast system according to an embodiment of the present disclosure has been described with reference to FIG. 3, and another example of a structure of a broadcast system according to an embodiment of the present disclosure will be described with reference to FIG. 4.

Figure 4:
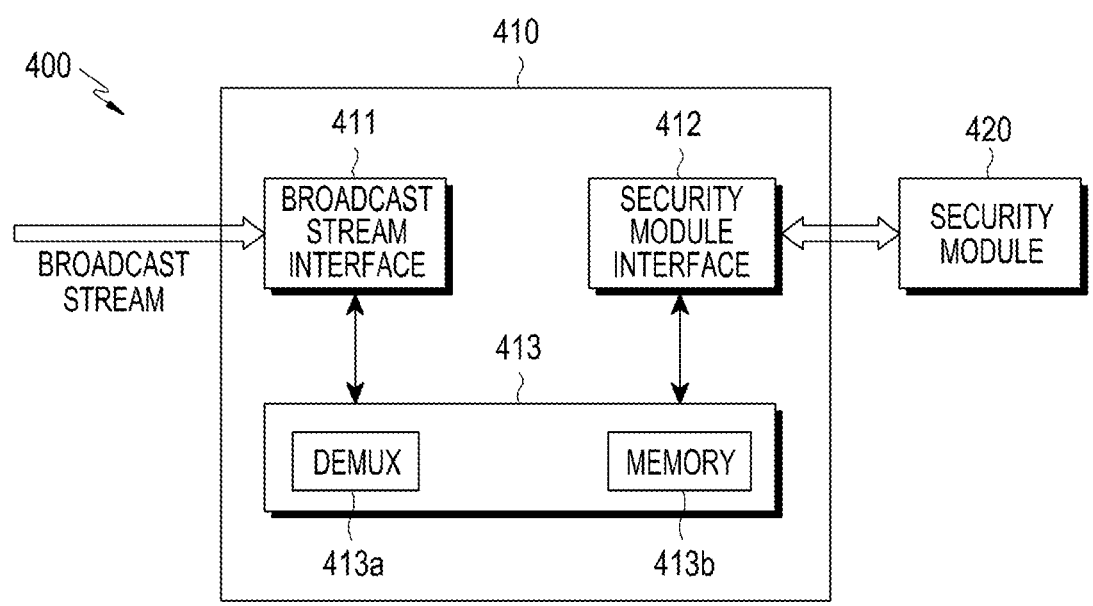
FIG. 4 schematically illustrates a broadcast system according to an embodiment of the present disclosure.

FIG. 4 schematically illustrates a structure of a broadcast system according to an embodiment of the present disclosure.

Referring to FIG. 4, a system is illustrated according to a third embodiment of the present disclosure. A broadcast system 400 comprises a broadcast receiving apparatus 410 and a security module 420 removably connected to the broadcast receiving apparatus 410. The broadcast receiving apparatus 410 includes a broadcast stream interface 411, a security module interface 412, and a controller 413.

The security module 420 includes a broadcast receiver interface, a validation unit, a security unit, and a memory. It will be noted that the broadcast receiver interface, the validation unit, the security unit, and the memory included in the security module 420 are not shown in FIG. 4. The broadcast receiving apparatus 410 and security module 420 are similar to those illustrated in FIGS. 1 and 2, and a detailed description of similar elements will not be repeated here.

In an embodiment of the present disclosure, the controller 413 filters data received through the broadcast stream to select data that is required by the security module 420. The security module 420 stores filtering criteria in a local memory of the security module 420, which can be used to identify the data that is required. The security module 420 retrieves the filtering criteria from the local memory and transmits the filtering criteria to the broadcast receiving apparatus 410. For example, the security module 420 may provide the broadcast receiving apparatus 410 with filtering criteria of the security module 420 when the security module 420 and the broadcast receiving apparatus 410 are connected for the first time.

As shown in FIG. 4, the controller 413 of the broadcast receiving apparatus 410 includes a de-multiplexer (DE-MUX) 413a and a memory 413b for storing filtering criteria. The broadcast receiving apparatus 410 can tune to a broadcast multiplex received through the broadcast stream interface 411, for example a multiplexed broadcast stream carrying an MPEG2 transport stream (TS) and select a service carried in the broadcast multiplex. The controller 413 receives filtering criteria from the security module 420, and store the received filtering criteria in the memory 413b. The controller 413 filters data received through the broadcast stream by controlling the DEMUX 413a according to the stored filtering criteria.

The DEMUX 413a filters the data received through the broadcast stream by de-multiplexing the broadcast stream, and comparing de-multiplexed sections of the broadcast stream to the filtering criteria to check whether a section matches the filtering criteria. When a match is found, the controller 413 passes the selected data to the security module 420 via the security module interface 412. Depending on an embodiment of the present disclosure, the controller 413 may transmit the selected data to the security module 420 in a raw section format, that is, in the format in which the data was received through the broadcast stream, or alternatively may re-package the selected data. For example, data from a plurality of selected sections of the broadcast multiplex may be concatenated into a larger packet format and transmitted the packet format to the security module 420.

Additionally, in various embodiments of the present disclosure, the broadcast receiving apparatus 410 may provide certain sections of the broadcast multiplex to the security module 420 by default. For example, the broadcast receiving apparatus 410 can receive a plurality of services through the broadcast stream. When one of the services is selected, the broadcast receiving apparatus 410 may extract a programme map table (PMT) associated with the selected service from the data received through the broadcast stream, and transmit the PMT of the selected service to the security module 420.

The security module 420 can be arranged to store a plurality of different filtering criteria in the memory of the security module 420, each associated with a different one of the plurality of services receivable through a broadcast stream. In response to the PMT being received, the security module 420 retrieves the filtering criteria associated with one of the services associated with the received PMT, and transmits the retrieved filtering criteria to the broadcast receiving apparatus 420. The controller 413 can then store the updated filtering criteria in a local memory 413b of the controller 413. This approach enables the security module 420 to request additional sections of the broadcast multiplex in relation to certain specific services.

In an embodiment of the filtering criteria can take various forms. For example, in a DVB system the filtering criteria may specify certain values of metadata, such as the programme identifier (PID), Table ID and/or other data, such as the table version. The filtering criteria can be applied to all TS packets for that service that are carrying MPEG2 sections, for example, encryption control messages (ECMs) or other private data, and can specify any fields within the table. The filtering criteria may be provided as a bit sequence to be matched against the corresponding metadata bits in a de-multiplexed section of the broadcast stream, and may include a mask such that certain bits are ignored by the DEMUX 413a when filtering the data.

Additionally, in various embodiments of the present disclosure, the filtering criteria may be used as a 'one-shot' filter in which the controller 413 deletes the filtering criteria once data matching the filtering criteria has been found. When the security module 420 only requires the first instance of the data, this avoids the DEMUX 413b continuing to search unnecessarily once the first instance of the data in the broadcast stream has been found.

Alternatively, the filtering criteria may be applied continuously, that is, may continue to be applied by the DEMUX 413a after the first match has been found. For example, in various embodiments of a continuous filter the controller 413 can compare a version bit included in the filtering criteria against a least significant bit (LSB) of a version number associated with a data element received through the broadcast stream, for example an Encryption Control Message (ECM).

The first time that the control unit 413 searches for that particular data element, the controller 413 may compare all bits of the version number to the corresponding version number bits specified in the filtering criteria, except the LSB.

Then in response to a match between the version bit and the LSB of the version number, the controller 413 transmits the associated data element to the security module 420 and updates the filtering criteria stored in the memory 413b by inverting the version bit.

Thereafter, the updated filtering criteria are then applied to data subsequently received through the broadcast stream by comparing the LSB of a received version number to the LSB in the filtering criteria, and optionally masking all other bits of the version number in the controller 413. This provides an efficient method of ensuring that future instances of the data element with the same version number will be ignored, whilst the next version will still be selected and transmitted to the security module 420 when the next version is detected, since the LSB of the version number will change between each version. This approach is particularly useful when handling ECMs by ensuring that updated versions of the ECMs are reliably sent to the security module 420, but a similar principle may be applied to other types of data element.

Filtering data at the broadcast receiving apparatus 410 before the data is transmitted to the security module 420 has the advantage of reducing the complexity required for the security module 420, in contrast to existing solutions, such as a common interface plus (CI+) which transmits the entire multiplex to the security module 420.

Although the broadcast stream interface 411, the security module interface 412, and the controller 413 are described as separate units in the broadcast receiving apparatus 410 in FIG. 4, it is to be understood that the broadcast receiving apparatus 410 may be implemented with a form into which at least two of the broadcast stream interface 411, the security module interface 412, and the controller 113 are incorporated.

The broadcast receiving apparatus 410 may be implemented with at least one processor.

Although the broadcast stream interface, the validation unit, the security unit, and the memory are described as separate units in the security module 420 in FIG. 4, it is to be understood that the security module 420 may be implemented with a form into which at least two of the broadcast stream interface, the validation unit, the security unit, and the memory are incorporated.

The security module 420 may be implemented with at least one processor.

Another example of a structure of a broadcast system according to an embodiment of the present disclosure has been described with reference to FIG. 4, and a process of identifying location of a data file in a broadcast system according to an embodiment of the present disclosure will be described with reference to FIG. 5.

Figure 5:
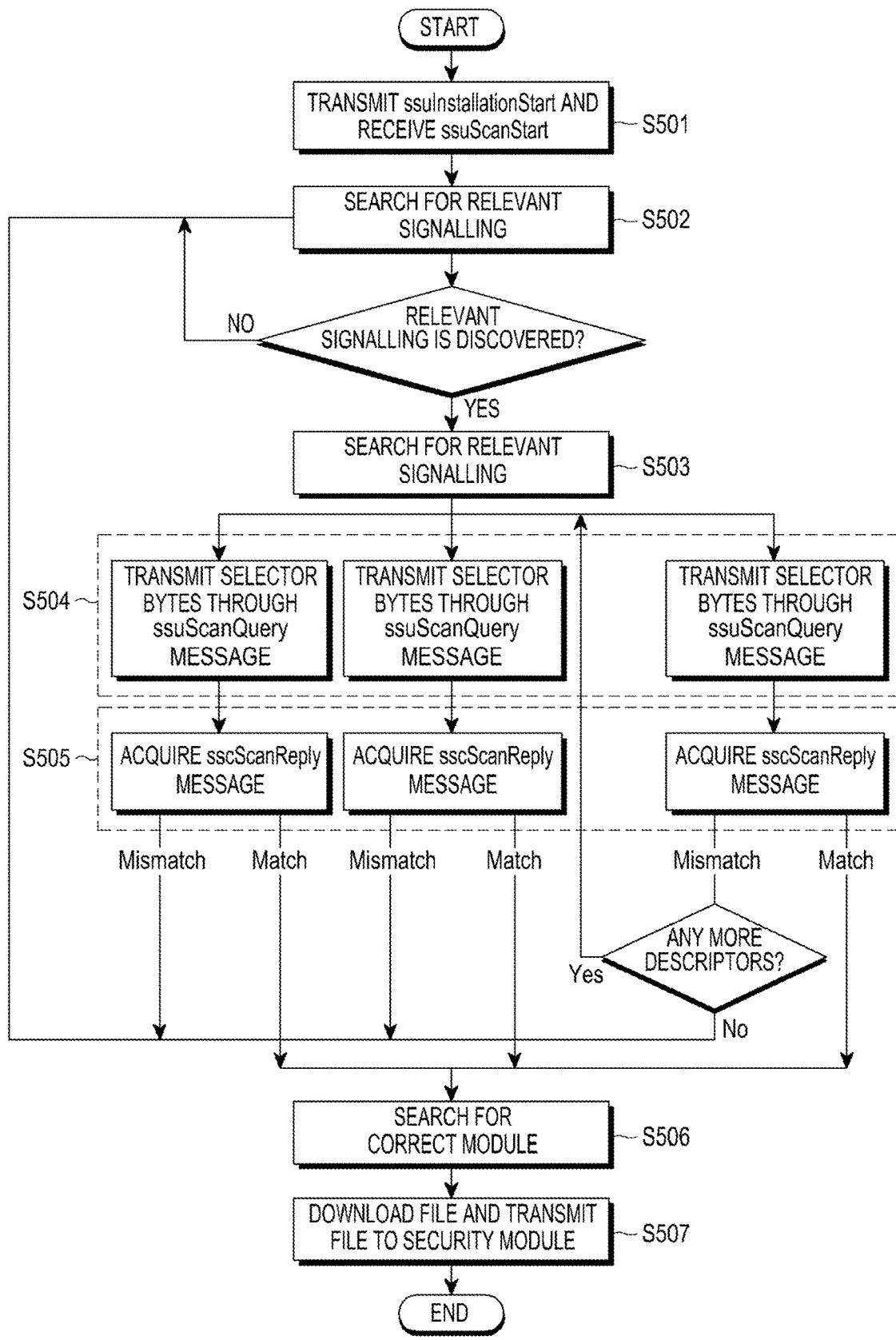
FIG. 5 is a flowchart illustrating a process of identifying a data file in a broadcast system according to an embodiment of the present disclosure.

FIG. 5 is a flowchart illustrating illustrates a process of identifying location of a data file in a broadcast system according to an embodiment of the present disclosure.

Referring to FIG. 5, it will be noted that a process of identifying location of a data file in FIG. 5 is a process of identifying a location of a data file required by a security module is illustrated, according to a fourth embodiment of the present disclosure. The process of identifying location of a data file in FIG. 5 can be implemented in any of the systems described above, such as those illustrated in FIGS. 1 to 4.

In an embodiment of the present disclosure, a broadcast receiving apparatus comprises an interface capable of receiving a data file, such as a broadcast stream interface, a network interface or a device interface as described in FIG. 1, and further comprises a security module interface to be removably connected to the security module as described above. Additionally, in an embodiment of the present disclosure, the controller of the broadcast receiving apparatus receives information for identifying a location of the data file from the security module, retrieves the data file from the identified location via the first interface, and transmits the retrieved data file to the security module via the second interface.

A process by which the controller of the broadcast receiving apparatus can identify the location of the data file is shown in FIG. 5. In an embodiment of the present disclosure, a broadcast system is a DVB system and a process of identifying location of a data file is used to locate a data file in a DSM-CC data carousel. Carousels are used in a DVB system and other broadcasting systems to distribute data files to receivers. The metadata for a carousel defines a hierarchical data structure comprising a plurality of levels, and in an embodiment of the present disclosure, the controller of the broadcast receiving apparatus searches for the data file by starting at a top level of the hierarchical data structure and progressively navigating through lower levels until the data file has been located, and queries the security module at each level in order to identify the correct location at the level currently being searched.

In FIG. 5, ssuInstallationStart and ssuScanQuery are messages sent from the broadcast receiving apparatus to the security module, and ssuScanStart and ssuScanReply are messages sent from the security module to the broadcast receiving apparatus. SSU-link denotes the selector bytes from signalling in a network information table (NIT) or bouquet association table (BAT), and SSU-info denotes the selector bytes in the signalling in the PMT. Finally, groupInfo denotes data from the signalling in the DSM-CC DSI or update notification table (UNT).

As shown in FIG. 5, the process of identifying the location of the data file starts at operation S501 with the controller of the broadcast receiving apparatus generating the ssuInstallationStart message and transmitting the generated ssuInstallationStart message to the security module.

Upon receiving the ssuInstallationStart message from the broadcast receiving apparatus, the security module transmits a ssuScanStart message as a response message to the ssuInstallationStart message to the broadcast receiving apparatus, so the broadcast receiving apparatus receives the ssuScanStart message. The ssuScanStart message includes an organizationally unique identifier (OUI) specified by the security module. In operation S502, the controller searches for the relevant signalling in the broadcast stream, e.g., the OUI.

The controller determines whether the relevant signalling, e.g., the OUI is detected, and if the relevant signalling is detected, the controller, in operation S503, begins searching the next level down in the hierarchical data structure of the carousel by searching for instances of SSU-link, SSU-info or groupInfo signalling bits. Here, the signalling bits are transmitted by the broadcast receiving apparatus to the security module in an ssuScanQuery message at operation S504. Upon receiving signalling bits through a ssuScanQuery message from the broadcast receiving apparatus, the security module determines whether the signalling bits match signalling bits of a requested data file, and transmits a ssuScanReply message, indicating the determined result, as a response message to the ssuScanQuery message to the broadcast receiving apparatus. The broadcast receiving apparatus may acquire, i.e., receive the ssuScanReply message transmitted from the security module and detect the result of determining whether the signalling bits match the signalling bits of the requested data file based on the ssuScanReply message. Accordingly, if the signalling bits does not match the signalling bits of the requested data file, that is, if the ssuScanReply message indicates a negative result, the broadcast receiving apparatus returns to operation S502 and continues searching for relevant signalling. Here, the meaning of 'relevant signalling' changes according to the level that is currently being searched. At operation S502 of the process of identifying the data file, the relevant signalling comprises SSU-link, SSU-info or groupInfo bits.

If the signalling bits match the signalling bits of the requested data file, that is, if the ssuScanReply message indicates a positive result at operation S505, the controller of the broadcast receiving apparatus searches for a correct module at operation S506, for example, a module in the carousel associated with the SSU-link, SSU-info or groupInfo signalling bits which were found to be a match among the signalling bits and the signalling bits of the requested data file at operation S505. Once the correct module is found, the file has been located and the controller of the broadcast receiving apparatus downloads the file at operation S507 and transmits the downloaded file to the security module. For example, the broadcast stream may comprise a plurality of multiplexed data files, and the controller of the broadcast receiving apparatus may extract the data file from an identified location within the multiplexed broadcast stream. Alternatively the controller of the broadcast receiving apparatus could download the data file by some other means, for example from an internet server via a network interface.

A process of identifying location of a data file as shown in FIG. 5 can be used when the broadcast receiving apparatus is able to locate a number of carousels on different DVB broadcast services but may not itself be capable of determining which is the correct carousel. Even when it has found the carousel, the controller of the broadcast receiving apparatus still may not be capable on its own of locating the correct file within the carousel. The process of identifying the location of the data file in FIG. 5 enables the security module to assist the broadcast receiving apparatus in locating the download file, which then downloads the file on behalf of the security module.

During the process of identifying the location of the data file shown in FIG. 5, the security module may assist the controller of the broadcast receiving apparatus in various ways, as follows:

(1) The security module can help the broadcast receiving apparatus to locate potential carousels;

(2) The security module may provide the broadcast receiving apparatus with the OUI which is used in the signalling for the carousel;

(3) The security module may provide the broadcast receiving apparatus with a pointer to the location of to the correct DVB multiplex or DVB service carrying the carousel;

(4) The security module may check the DVB signalling, passed to the security module by the broadcast receiving apparatus;

(5) The security module may check a compatibility descriptor (CompatibilityDescriptor) in the DSI, passed to the security module by the broadcast receiving apparatus;

(6) The security module can help the broadcast receiving apparatus to locate the correct file in the carousel;

(7) The security module may provide the broadcast receiving apparatus with all or part of the label of the module carrying the file; and (8) The security module may provide the broadcast receiving apparatus with all or part of the module ID of the module carrying the file.

Methods, such as those described above in relation to the fourth embodiment of the present disclosure use the security module to locate files to be downloaded, by providing information to the controller of the broadcast receiving apparatus which can be used to identify the location of the file. For example, an operator who operates the security module may control the location of files which are required by the security module, and pass information related to the location of the files to the security module using some proprietary means. This can happen without the broadcast receiving apparatus, e.g., a TV having any knowledge of the operator's network configuration, which can vary widely between operators. Methods, such as those described in relation to the fourth embodiment of the present disclosure can therefore provide greater interoperability, by enabling the broadcast receiving apparatus to locate and download data files for security modules from different operators without requiring knowledge of the operator's network configuration. This approach also relieves the security module from the burden of having to implement download software itself, and reduces and simplifies the traffic between the security module and the broadcast receiving apparatus.

Although the fourth embodiment of the present disclosure has been described in relation to a DVB system, it should be understood that similar methods can be applied to non-DVB systems. In addition, it should be noted that a process of identifying location of a data file shown in FIG. 5 can be applied to other systems in which the broadcast stream includes metadata that defines a hierarchical data structure comprising a plurality of levels.

Although FIG. 5 illustrates a process of identifying location of a data file in a broadcast system according to an embodiment of the present disclosure, various changes could be made to FIG. 5. For example, although shown as a series of operations, various operations in FIG. 5 could overlap, occur in parallel, occur in a different order, or occur multiple times.

An embodiment of the present disclosure will be described below.

Firstly, instead of a broadcast receiving apparatus, a security module may validate whether data received through a network is from a correct broadcast transmitting apparatus, e.g., a broadcaster and whether the received data is tampered with. For example, the security module may validate a content.

The network may be a broadcast network or an internet protocol (IP) network. The network may be a storage device on a device itself which is not protected. For example, the device may be a storage device, such as a memory stick.

The security module ensures that the received data is transmitted by an authorised broadcast transmitting apparatus. In this case, the broadcast transmitting apparatus may be a broadcaster or an owner of the security module. If data is transmitted from the authorised broadcast transmitting apparatus to the broadcast receiving apparatus, the security module ensures that the data is not altered in anyway.

Further, a format of the data may be, for example, a data block which is divided into three segments including a header, a body, and a footer. One of the header and the footer may be empty. It will be noted that the body may be encrypted to obscure contents being transmitted via the network. Data transmitted in the header and the footer is private to the security module, and there are no comments over the format.

An algorithm and mechanisms used to encrypt and verify the data will not be defined separately, and may be, for example, a private algorithm and mechanisms of the security module or industry standard mechanisms. Two different mechanisms are outlined for the security module determine whether the data transmitted to the broadcast receiving apparatus is valid and legitimate.

Firstly, data, e.g., a data block, received in the broadcast receiving apparatus is transmitted to the security module where the data is validated and decoded, and the data is returned to the broadcast receiving apparatus with status of the data block, e.g., good/bad status. A header and a footer included in the data block are transmitted to the security module, and the security module returns an encryption key to allow the broadcast receiving apparatus to decode a body of the data block. A hash of the body is returned to the security module which allows the security module to return status of the data block, e.g., good/bad status.

Another embodiment of the present disclosure will be described below.

In order that a security communication link between an external device, e.g., a CS device and a broadcast receiving apparatus, e.g., a TV is established, another embodiment of the present disclosure proposes an operation among the CS device, the TV, and a security module. Here, the CS device may be, for example, a telephone, a table, and/or the like. The operation exchanges information between the CS device and the security module via the TV at the end of transaction, and a key which is used to secure a link for all subsequent messages between the CS device and the TV is provided to the TV.

Accordingly, a communication path between the TV and the CS device is protected using the security module for establishing authenticity of the CS device and defining a security key for all encrypted messages. This addresses a problem that both of the CS device and the TV have dynamic IP addresses and general secure socket layer (SSL) type-protocols do not work as any client certificate is not able to authenticate a server using the dynamic IP addresses.

Still another embodiment of the present disclosure will be described below.

Still another embodiment of the present disclosure describes an operation of performing a remote de-multiplexing operation whereby a broadcast receiving apparatus, e.g., a de-multiplexing hardware of a TV is remotely controlled by a security module in order that the de-multiplexing hardware of the TV may filter information from a broadcast stream. This differs from concepts used in a common interface (CI) module where the whole transport stream, e.g., a broadcast stream is transmitted through the CI module and the CI module has its own de-multiplexing hardware to extract information from the broadcast stream. In an embodiment of the present disclosure, a de-multiplexer included in the TV may perform a de-multiplexing operation instead of a security module.

Still another embodiment of the present disclosure proposes a method by which a security module may traverse a broadcast hierarchy in order to acquire data, e.g., firmware upgrade, and/or the like, this has been described with reference to FIG. 5, and a detailed description thereof will be omitted herein.

Another example of an inner structure of a broadcast receiving apparatus in a broadcast system according to an embodiment of the present disclosure will be described with reference to FIG. 6.

Figure 6:
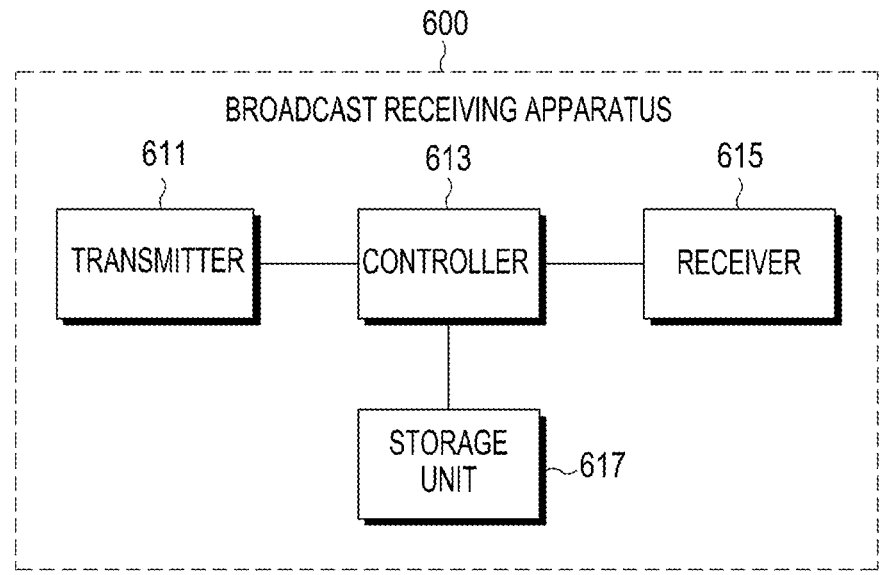
FIG. 6 schematically illustrates an inner structure of a broadcast receiving apparatus in a broadcast system according to an embodiment of the present disclosure.

FIG. 6 schematically illustrates an inner structure of a broadcast receiving apparatus in a broadcast system according to an embodiment of the present disclosure.

Referring to FIG. 6, a broadcast receiving apparatus 600 includes a transmitter 611, a controller 613, a receiver 615, and a storage unit 617.

The controller 613 controls the overall operation of the broadcast receiving apparatus 600, and more particularly, controls the broadcast receiving apparatus 600 to perform an operation related to an operation of providing a security service in a broadcast system according to an embodiment of the present disclosure. The operation related to the operation of providing the security service in the broadcast system according to an embodiment of the present disclosure which the broadcast receiving apparatus 600 performs has been described with reference to FIGS. 1 to 5 and a detailed description thereof will be omitted herein.

The transmitter 611 transmits various signals, various messages, and/or the like to other devices, e.g., an external device, such as a CS device, a security device, and/or the like under a control of the controller 613. The various signals, the various messages, and/or the like transmitted in the transmitter 611 have been described in FIGS. 1 to 5 and a detailed description thereof will be omitted herein.

The receiver 615 receives various signals, various messages, and/or the like from other devices, e.g., an external device, such as a CS device, a security device, and/or the like under a control of the controller 613. The various signals, the various messages, and/or the like received in the receiver 615 have been described in FIGS. 1 to 5 and a detailed description thereof will be omitted herein.

The storage unit 617 stores various programs, data, and/or the like for the broadcast receiving apparatus 600 to perform the operation related to the operation of providing the security service in the broadcast system according to an embodiment of the present disclosure, as described in FIGS. 1 to 5, and data, and/or the like which occurs while performing the operation related to the operation of providing the security service in the broadcast system according to an embodiment of the present disclosure, as described in FIGS. 1 to 5.

Although the transmitter 611, the controller 613, the receiver 615, and the storage unit 617 are described as separate units in the broadcast receiving apparatus 600 in FIG. 6, it is to be understood that the broadcast receiving apparatus 600 may be implemented with a form into which at least two of the transmitter 611, the controller 613, the receiver 615, and the storage unit 617 are incorporated.

The broadcast receiving apparatus 600 may be implemented with at least one processor.

Another example of an inner structure of a broadcast receiving apparatus in a broadcast system according to an embodiment of the present disclosure has been described with reference to FIG. 6, and another example of an inner structure of a security device in a broadcast system according to an embodiment of the present disclosure will be described with reference to FIG. 7.

Figure 7:
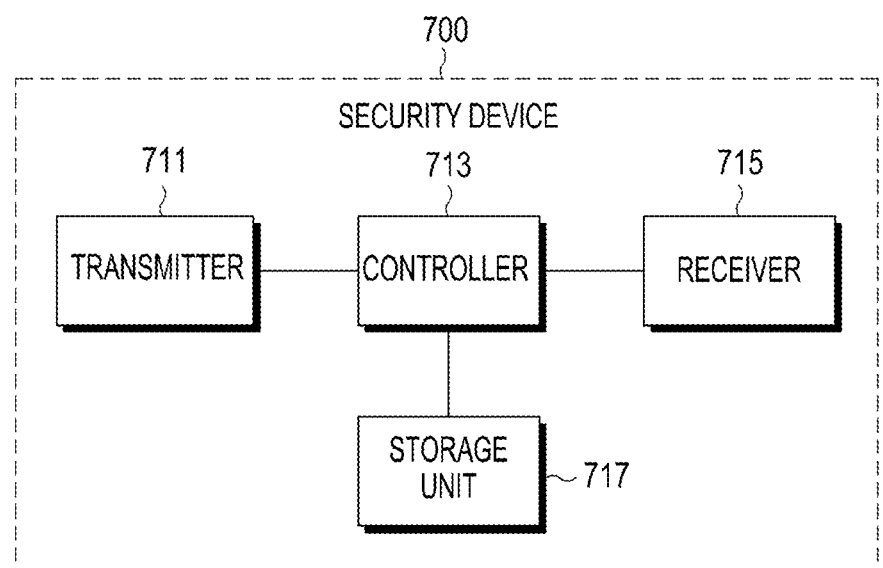
FIG. 7 schematically illustrates an inner structure of a security device in a broadcast system according to an embodiment of the present disclosure.

FIG. 7 schematically illustrates an inner structure of a security device in a broadcast system according to an embodiment of the present disclosure.

Referring to FIG. 7, a security device 700 includes a transmitter 711, a controller 713, a receiver 715, and a storage unit 717.

The controller 713 controls the overall operation of the security device 700, and more particularly, controls the security device 700 to perform an operation related to an operation of providing a security service in a broadcast system according to an embodiment of the present disclosure. The operation related to the operation of providing the security service in the broadcast system according to an embodiment of the present disclosure which the security device 700 performs has been described with reference to FIGS. 1 to 5 and a detailed description thereof will be omitted herein.

The transmitter 711 transmits various signals, various messages, and/or the like to other devices, e.g., an external device, such as a CS device, a broadcast receiving apparatus, and/or the like under a control of the controller 713. The various signals, the various messages, and/or the like transmitted in the transmitter 711 have been described in FIGS. 1 to 5 and a detailed description thereof will be omitted herein.

The receiver 715 receives various signals, various messages, and/or the like from other devices, e.g., an external device, such as a CS device, a broadcast receiving apparatus, and/or the like under a control of the controller 713. The various signals, the various messages, and/or the like received in the receiver 715 have been described in FIGS. 1 to 5 and a detailed description thereof will be omitted herein.

The storage unit 717 stores various programs, data, and/or the like for the security device 700 to perform the operation related to the operation of providing the security service in the broadcast system according to an embodiment of the present disclosure, as described in FIGS. 1 to 5, and data, and/or the like which occurs while performing the operation related to the operation of providing the security service in the broadcast system according to an embodiment of the present disclosure, as described in FIGS. 1 to 5.

Although the transmitter 711, the controller 713, the receiver 715, and the storage unit 717 are described as separate units in the security device 700 in FIG. 7, it is to be understood that the security device 700 may be implemented with a form into which at least two of the transmitter 711, the controller 713, the receiver 715, and the storage unit 717 are incorporated.

The security device 700 may be implemented with at least one processor.

Another example of an inner structure of a security device in a broadcast system according to an embodiment of the present disclosure has been described with reference to FIG. 7, and an inner structure of an external device in a broadcast system according to an embodiment of the present disclosure will be described with reference to FIG. 8.

Figure 8:
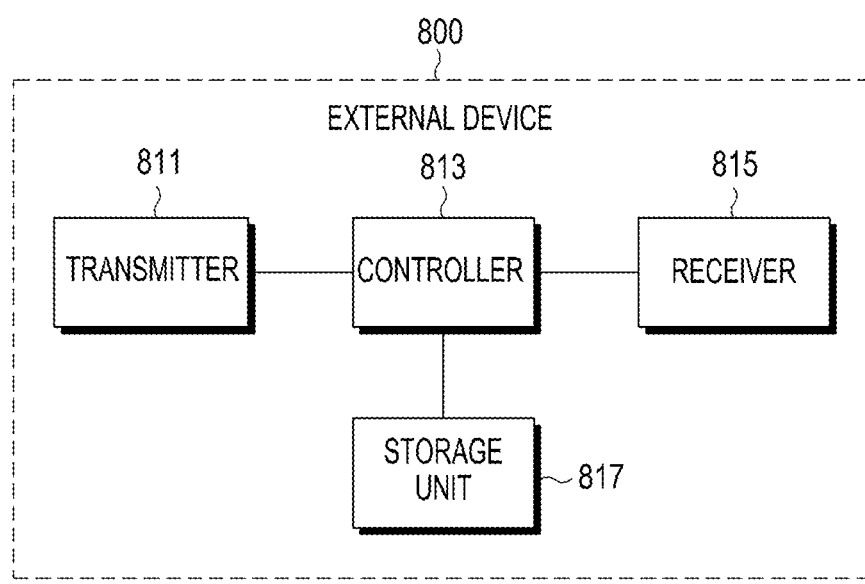
FIG. 8 schematically illustrates an inner structure of an external device in a broadcast system according to an embodiment of the present disclosure.

FIG. 8 schematically illustrates an inner structure of an external device in a broadcast system according to an embodiment of the present disclosure.

Referring to FIG. 8, an external device 800 includes a transmitter 811, a controller 813, a receiver 815, and a storage unit 817.

The controller 813 controls the overall operation of the external device 800, and more particularly, controls the external device 800 to perform an operation related to an operation of providing a security service in a broadcast system according to an embodiment of the present disclosure. The operation related to the operation of providing the external device 800 in the broadcast system according to an embodiment of the present disclosure which the external device 800 performs has been described with reference to FIGS. 1 to 5 and a detailed description thereof will be omitted herein.

The transmitter 811 transmits various signals, various messages, and/or the like to other devices, e.g., a broadcast receiving apparatus, a security device, and/or the like under a control of the controller 813. The various signals, the various messages, and/or the like transmitted in the transmitter 811 have been described in FIGS. 1 to 5 and a detailed description thereof will be omitted herein.

The receiver 815 receives various signals, various messages, and/or the like from other devices, e.g., a broadcast receiving apparatus, a security device, and/or the like under a control of the controller 813. The various signals, the various messages, and/or the like received in the receiver 815 have been described in FIGS. 1 to 5 and a detailed description thereof will be omitted herein.

The storage unit 817 stores various programs, data, and/or the like for the external device 800 to perform the operation related to the operation of providing the security service in the broadcast system according to an embodiment of the present disclosure, as described in FIGS. 1 to 5, and data, and/or the like which occurs while performing the operation related to the operation of providing the security service in the broadcast system according to an embodiment of the present disclosure, as described in FIGS. 1 to 5.

Although the transmitter 811, the controller 813, the receiver 815, and the storage unit 817 are described as separate units in the external device 800 in FIG. 8, it is to be understood that the external device 800 may be implemented with a form into which at least two of the transmitter 811, the controller 813, the receiver 815, and the storage unit 817 are incorporated.

The external device 800 may be implemented with at least one processor.

An embodiment of the present disclosure provides a broadcast receiving apparatus connectable to a removable security module for providing a security service, and the broadcast receiving apparatus comprises a first interface to receive a data file, a second interface to be removably connected to the security module, and a controller to control the second interface to transmit validation information for use in validating the received data file to the security device, to control the second interface to receive a validation result from the security device, and to perform an action on the data file in response to a successful validation of the data file by the security module.

Preferably, the controller controls the second interface to transmit a header included in the data file to the security module, controls the second interface to receive decryption information for use in decrypting a body of the data file from the security module, and decrypts the body of the data file based on the received decryption information.

Preferably, the controller generates information for use in validating the received data file based on the decrypted body, and controls the second interface to transmit the generated information to the security module without transmitting the entire decrypted body.

Preferably, the information for use in validating the data file includes a complete data file.

Preferably, the controller generates a hash of a part or all of the received data file and controls the second interface to transmit the generated hash to the security module as the information for use in validating the received data file.

Preferably, the controller formats information related to the data file according to a format specified by the security module.

Preferably, the controller packetizes the data file into a plurality of data packets, and controls the second interface to transmit the plurality of data packets to the security module.

Preferably, wherein the controller selects a size of each of data packets according to an amount of memory available to the security module.

Preferably, the security module for use with the broadcast receiving apparatus comprises an interface to be removably connected to the broadcast receiving apparatus, and a validation unit to receive information for use in validating the received data file via the interface, attempt to validate the data file based on the received information, and to inform the broadcast receiving apparatus of a result of the validation via the interface.

Preferably, prior to receiving the information for use in validating the data file, the validation unit transmits a message over the interface to signal to the broadcast receiving apparatus a format in which the information is to be provided.

Preferably, the security module further comprises a security unit to generate decryption information for use in decrypting a body of the received data file, and the security unit transmits the generated decryption information to the broadcast receiving apparatus via the interface.

Another embodiment of the present disclosure provides a broadcast receiving apparatus connectable to a removable security module for providing a security service, and the broadcast receiving apparatus comprises a first interface to communicate with an external device, a second interface to be removably connected to the security module, and a controller to control an interaction between the broadcast receiving apparatus and the external device, wherein in response to a message being received over the first interface, the controller controls the second interface to transmit a validation request to the security module, the validation request including security information for use in validating a source of the message, and the controller controls the second interface to receive a validation result from the security module, and permits interaction with the external device in response to a successful validation by the security module.

Preferably, the broadcast receiving apparatus further comprises a communication unit to encrypt and decrypt communications sent and received over the first interface, and in response to interaction between the broadcast receiving apparatus and the external device being permitted, the communication unit communicates with the external device based on an encryption key provided by the security module.

Preferably, the controller extracts the security information for use in validating the source of the message from the received message.

Preferably, in response to a request for additional security information being received from the security module after transmitting the validation request, the controller controls the first interface to request the additional security information from the external device, controls the first interface to receive the additional security information from the external device, and controls the second interface to transmit the additional security information to the security module.

Preferably, the security module for use with the broadcast receiving apparatus comprises an interface to be removably connected to the broadcast receiving apparatus, and a validation unit to receive a validation request via the interface, the validation request including security information for use in validating a source of a message, wherein the validation unit attempts to validate the source of the message based on the received security information, and inform the broadcast receiving apparatus of a result of the validation via the interface.

Preferably, the security module further comprises a security unit to generate an encryption key for communicating with the source of the message, in response to a successful validation, the security unit transmits the generated encryption key to the broadcast receiving apparatus via the interface.

Preferably, the validation unit determines whether additional security information is required in order to validate the source of the message, and in response to a determination that the additional security information is required, the validation unit transmits a request for the additional security information to the broadcast receiving apparatus via the interface.

Still another embodiment of the present disclosure provides a broadcast receiving apparatus connectable to a removable security module for providing a security service, and the broadcast receiving apparatus comprises a first interface to receive a broadcast stream, a second interface to be removably connected to the security module, and a controller to apply at least one filtering criterion to data received through the broadcast stream to select data that is required by the security module, and controls the second interface to transmit the selected data to the security module.

Preferably, the controller controls the second interface to receive the at least one filtering criterion from the security module.

Preferably, the controller compares a version bit included in the at least one filtering criterion against an LSB of a version number associated with a data element received through the broadcast stream, and controls the second interface to transmit the associated data element to the security module in response to a match between the version bit and the LSB of the version number, and in response to a match between the version bit and the LSB of the version number, the controller updates the at least one filtering criterion by inverting the version bit and to apply the updated at least one filtering criterion to data subsequently received through the broadcast stream.

Preferably, the controller deletes the at least one filtering criterion once data matching the at least one filtering criterion has been found.

Preferably, the broadcast receiving apparatus controls the first interface to receive a plurality of services through the broadcast stream, and in response the broadcast receiving apparatus receiving a command to select one of the services, the controller extracts a PMT associated with the selected service from the data received through the broadcast stream, controls the second interface to transmit the extracted PMT to the security module, and controls the second interface to receive updated at least one filtering criterion for the selected service from the security module.

Preferably, the security module for use with the broadcast receiving apparatus comprises an interface to be removably connected to the broadcast receiving apparatus, and a memory to store at least one filtering criterion for filtering data received through the broadcast stream, the security module retrieves the at least one filtering criterion from the memory and transmits the at least one filtering criterion to the broadcast receiving apparatus via the interface.

Preferably, the memory stores a plurality of different filtering criteria each associated with a different one of a plurality of services receivable through a broadcast stream, in response to receiving a PMT through the interface, the security module retrieves the filtering criteria associated with one of the services associated with the received PMT and transmit the retrieved filtering criteria to the broadcast receiving apparatus via the interface.

Still another example of the present disclosure provides a broadcast receiving apparatus connectable to a removable security module for providing a security service, and the broadcast receiving apparatus comprises a first interface capable of receiving a data file, a second interface to be removably connected to the security module, and a controller controls the second interface to receive information for identifying a location of the data file from the security module, retrieve the data file from the identified location via the first interface, and controls the second interface to transmit the retrieved data file to the security module.

Preferably, the first interface receives a multiplexed broadcast stream comprising a plurality of multiplexed data files, and the controller extracts the data file from a location within the multiplexed broadcast stream identified by the information received from the security module.

Preferably, the broadcast receiving apparatus receives metadata defining a hierarchical data structure comprising a plurality of levels, and searches for the data file by starting at a top level of the hierarchical data structure and progressively navigating through lower levels until the data file has been located, and the broadcast receiving apparatus queries the security module at each level in order to identify the correct location at the level currently being searched.

Preferably, the controller controls the second interface to receive information from the security module to identify a location at which to search for the data file in the next level.

Preferably, the controller controls the second interface to transmit at least part of the received metadata to the security module.

Preferably, the controller starts at the top level by searching for an OUI specified by the security module.

Preferably, the security module for use with the broadcast receiving apparatus comprises an interface be removably connected to the broadcast receiving apparatus, and a memory to store a location of a data file, in response to a request for assistance in locating the data file, the security module generates information for identifying a location of the data file based on the stored information, transmits the generated information to the broadcast receiving apparatus via the interface, and subsequently receives the data file via the interface.

Still another embodiment of the present disclosure provides a control method of a broadcast receiving apparatus connectable to a removable security module for providing a security service, and the control method comprises, receiving a data file via a first interface, transmitting information for use in validating the received data file to the security module over a second interface, receiving a validation result from the security module over the second interface, and performing an action on the data file in response to a successful validation of the data file by the security module.

Still another embodiment of the present disclosure provides a control method of a security module comprising an interface to be removably connected to a broadcast receiving apparatus, and the control method comprises receiving information for use in validating a data file via the interface, attempting to validate the data file based on the received information, and informing the broadcast receiving apparatus of a result of the validation via the interface.

Still another embodiment of the present disclosure provides a control method of a broadcast receiving apparatus connectable to a removable security module for providing a security service, and the broadcast receiving apparatus comprising a first interface to communicate with an external device, a second interface to be removably connected to the security module, and a controller to control an interaction between the broadcast receiving apparatus and the external device, and the control method comprises in response to a message being received over the first interface, transmitting a validation request to the security module over the second interface, the validation request including security information for use in validating a source of the message, receiving a validation result from the security module over the second interface, and permitting interaction with the external device in response to a successful validation by the security module.

Still another embodiment of the present disclosure provides a control method of a security module comprising an interface to be removably connected to a broadcast receiving apparatus, and the control method comprises receiving a validation request via the interface, the validation request including security information for use in validating a source of a message, attempting to validate the source based on the received security information, and informing the broadcast receiving apparatus of a result of the validation via the interface.

Still another embodiment of the present disclosure provides a control method of a broadcast receiving apparatus connectable to a removable security module for providing a security service, the broadcast receiving apparatus comprising a first interface to receive a broadcast stream and a second interface to be removably connected to the security module, and the control method comprises applying at least one filtering criterion to data received through the broadcast stream to select data that is required by the security module, and passing the selected data to the security module via the second interface.

Still another embodiment of the present disclosure provides a control method of a security module comprising an interface to be removably connected to a broadcast receiving apparatus, and the control method comprises retrieving stored filtering criteria from memory, the filtering criteria comprising criteria for filtering data received through the broadcast stream, and transmitting the filtering criteria to the broadcast receiving apparatus via the interface.

Still another embodiment of the present disclosure provides a control method of broadcast receiving apparatus connectable to a removable security module for providing a security service, the broadcast receiving apparatus comprising a first interface capable of receiving a data file and a second interface to be removably connected to the security module, and the control method comprises receiving information for identifying a location of the data file from the security module, retrieving the data file from the identified location via the first interface, and transmitting the retrieved data file to the security module via the second interface.

Still another embodiment of the present disclosure provides a control method of a security module comprising an interface to be removably connected to a broadcast receiving apparatus, and the control method comprises in response to a request for assistance in locating a data file, generating information for identifying a location of the data file based on a known location of the data file stored in a memory, transmitting the generated information to the broadcast receiving apparatus via the interface, and subsequently receiving the data file via the interface.

Still another embodiment of the present disclosure provides a method of a security device in a communication system, and the method comprises receiving validation information used for validating data received by a receiving apparatus from the receiving apparatus, determining whether the validation information matches set validation related information, and transmitting information indicating the determined result to the receiving apparatus.

Preferably, the validation related information is received from a transmitting apparatus which transmits the data or is provided from the transmitting apparatus to the security device previously.

Still another embodiment of the present disclosure provides a method of a receiving apparatus in a communication system, and the method comprises receiving data from a transmitting apparatus, transmitting validation information used for validating data received by the receiving apparatus to a security device based on the data, receiving information indicating whether the validation information matches validation related information set in the security device from the security device, and performing an action for the received data if the information indicates that the validation information matches the validation related information set in the security device.

Preferably, if the information indicates that the validation information does not match the validation related information set in the security device, the method further comprises discarding the received data.

Preferably, the validation related information is received by the security device from a transmitting apparatus which transmits the data or is provided from the transmitting apparatus to the security device previously.

Still another embodiment of the present disclosure provides a method of a security device in a communication system, and the method comprises receiving a first message including security information used for validating an external device which wants to communicate with a receiving apparatus from the receiving apparatus, determining whether the security information matches set validation related information, and transmitting a second message including information indicating the determined result to the receiving apparatus.

Preferably, the validation related information is received from a transmitting apparatus which is related to the receiving apparatus or is provided from the transmitting apparatus to the security device previously.

Preferably, if the information indicates that the security information matches the validation related information, the second message further includes an encryption key used for a communication between the broadcast receiving apparatus and the external device.

Preferably, the first message further includes a session ID of a session which is established between the receiving apparatus and the security device, and the security information includes a token used for a communication between the receiving apparatus and the external device.

Preferably, the information includes information indicating whether the session ID is valid, and information indicating whether the token is valid.

Preferably, if the information indicates that the security information does not match the validation related information, the method further comprises receiving a third message including additional security information used for validating the external device which wants to communicate with the receiving apparatus from the receiving apparatus, determining whether the additional security information matches set validation related information, and transmitting a fourth message including information indicating the determined result to the receiving apparatus.

Still another embodiment of the present disclosure provides a method of a receiving apparatus in a communication system, and the method comprises receiving a first message indicating that an external device wants to communicate with the receiving apparatus from the external device, transmitting a second message including information used for validating the external device to a security device, receiving a third message including information indicating whether the security information matches validation related information set in the security device from the security device, and if the information indicates that the security information matches the validation related information set in the security device, communicating with the external device.

Preferably, the validation related information is received from a transmitting apparatus which is related to the receiving apparatus or is provided from the transmitting apparatus to the security device previously.

Preferably, if the information indicates that the security information matches the validation related information, the third message further includes an encryption key used for a communication between the broadcast receiving apparatus and the external device.

Preferably, the first message includes an ID of the security device, and a token used for a communication between the receiving apparatus and the external device.

Preferably, the second message further includes a session ID of a session which is established between the receiving apparatus and the security device, and the security information includes a token used for a communication between the receiving apparatus and the external device.

Preferably, the information includes information indicating whether the session ID is valid, and information indicating whether the token is valid.

Preferably, if the information indicates that the security information does not match the validation related information, the method further comprises transmitting a fifth message indicating that a validation process for the external device is progressing to the external device.

Preferably, the method further comprises receiving a sixth message indicating that the external device wants to communicate with the receiving apparatus from the external device, and transmitting, to the security device, a seventh message including additional security information used for validating the external device which wants to communicate with the receiving apparatus.

Preferably, the method further comprises receiving an eighth message including information indicating whether the additional security information matches the validation related information set in the security device from the security device.

Still another embodiment of the present disclosure provides control methods for all of a broadcast receiving apparatus and a security module. The control methods may be implemented through software instructions stored in a computer readable memory included in each of the broadcast receiving apparatus and the security module.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. A security device in a communication system, the security device comprising:
   a transceiver; and
   at least one processor coupled to the transceiver,
   wherein the at least one processor is configured to:
   receive, from a receiving apparatus, a first message including security information used for validating an external device which is to interact with the receiving apparatus and a session identifier (ID) of a session which is established between the receiving apparatus and the security device,
   determine whether the security information matches set validation related information,
   based on the session ID being valid and determining that the security information matches the set validation related information, transmit, to the receiving apparatus, a validation result for the session ID, a determined result for the security information, and an encryption key used for communication between the receiving apparatus and the external device, and
   based on the session ID being valid and determining that the security information does not match the set validation related information, transmit, to the receiving apparatus, a second message including the validation result for the session ID and a parameter value for requesting additional security information, and
   wherein the security information comprises information associated with an interaction between the receiving apparatus and the external device requested by the external device.

2. The security device of claim 1, wherein the validation related information is received from a transmitting apparatus which is related to the receiving apparatus or is provided from the transmitting apparatus to the security device previously.

3. The security device of claim 1, wherein the security information includes a token used for a communication between the receiving apparatus and the external device.

4. The security device of claim 1, wherein the at least one processor is further configured to:
   receive a third message including the additional security information used for validating the external device which wants to communicate with the receiving apparatus from the receiving apparatus,
   determine whether the additional security information matches the set validation related information, and
   transmit a fourth message including information indicating the determined result for the additional security information to the receiving apparatus.

5. A receiving apparatus in a communication system, the receiving apparatus comprising:
   a transceiver; and
   at least one processor coupled to the transceiver,
   wherein the at least one processor is configured to:

receive, from an external device, a first message indicating that the external device is to interact with the receiving apparatus, transmit, to a security device, a second message including security information used for validating the external device and a session identifier (ID) of a session which is established between the receiving apparatus and the security device, if the session ID is valid and the security information matches validation related information set in the security apparatus, receive, from the security device, a third message including a validation result for the session ID, a determined result for the security information, and an encryption key used for communication between the receiving apparatus and the external device, and if the session ID is valid and the security information does not match the validation related information, receive, from the security device, a fourth message including the validation result for the session ID and a parameter value for requesting additional security information used for validating the external device, and wherein the security information comprises an information associated with an interaction between the receiving apparatus and the external device requested by the external device.

6. The receiving apparatus of claim 5, wherein the validation related information is received from a transmitting apparatus which is related to the receiving apparatus or is provided from the transmitting apparatus to the security device previously.

7. The receiving apparatus of claim 5, wherein the security information includes a token used for a communication between the receiving apparatus and the external device.

8. The receiving apparatus of claim 5, wherein the at least one processor is further configured to:

if the session ID is valid and the security information does not match the validation related information, transmit a fifth message indicating that a validation process for the external device is progressing to the external device.

9. The receiving apparatus of claim 8, wherein the at least one processor is further configured to:

receive a sixth message indicating that the external device wants to communicate with the receiving apparatus from the external device, and transmit, to the security device, a seventh message including the additional security information used for validating the external device which wants to communicate with the receiving apparatus.

10. The receiving apparatus of claim 9, wherein the at least one processor is further configured to:

receive, from the security device, an eighth message including information indicating whether the additional security information matches the validation related information set in the security device.

* * * * *